July 31, 1951  D. FLEKEL  2,562,708
PHOTOGRAPHIC FILM TRANSPORTER
Filed Jan. 20, 1950  2 Sheets-Sheet 1
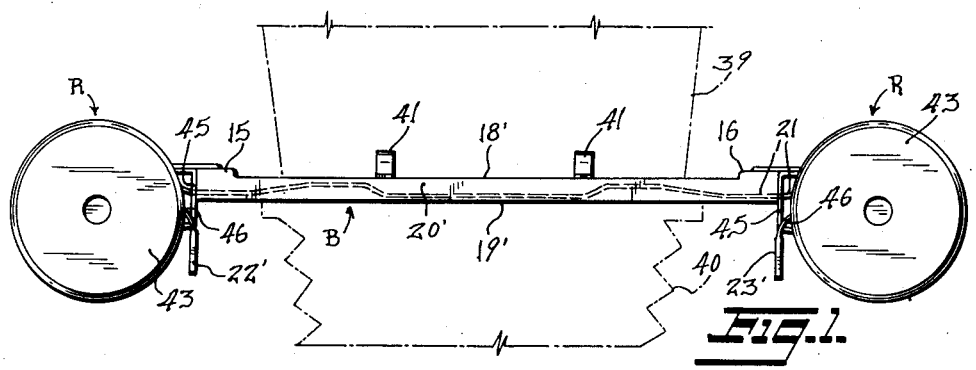
Fig. 1.
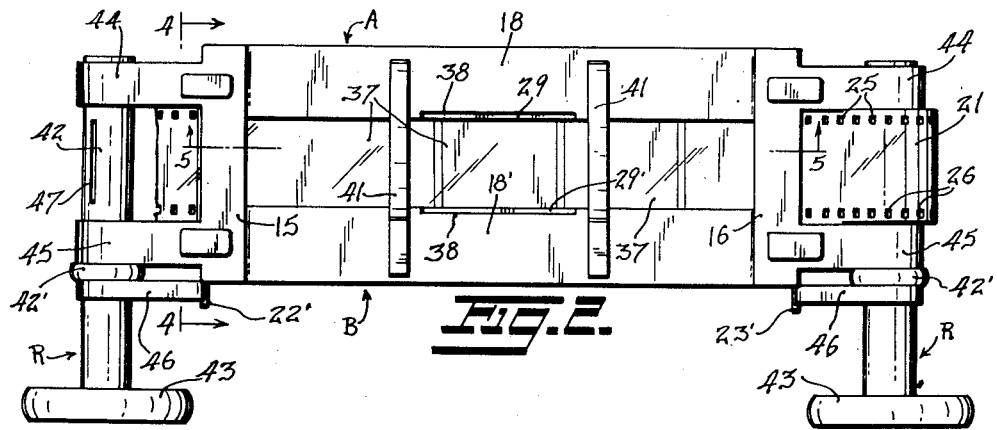
Fig. 2.
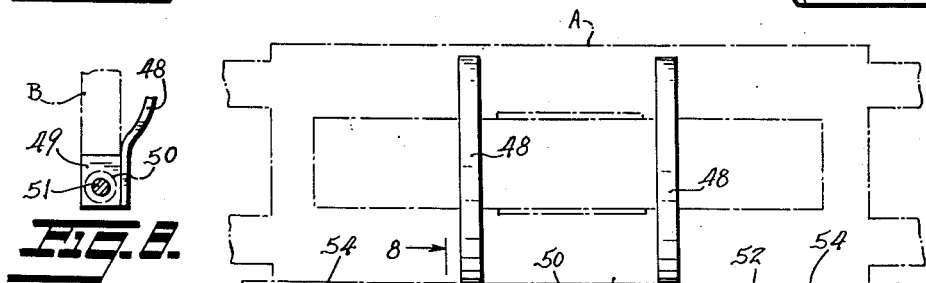
Fig. 8.  Fig. 7.
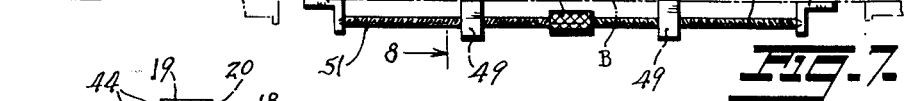
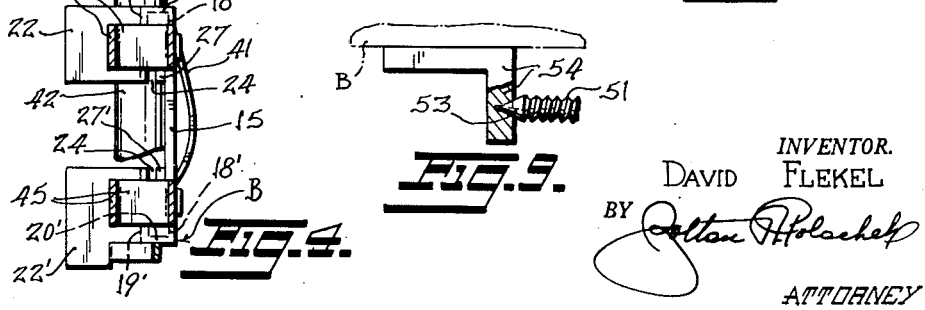
Fig. 4.  Fig. 9.
INVENTOR.
DAVID FLEKEL
BY
ATTORNEY

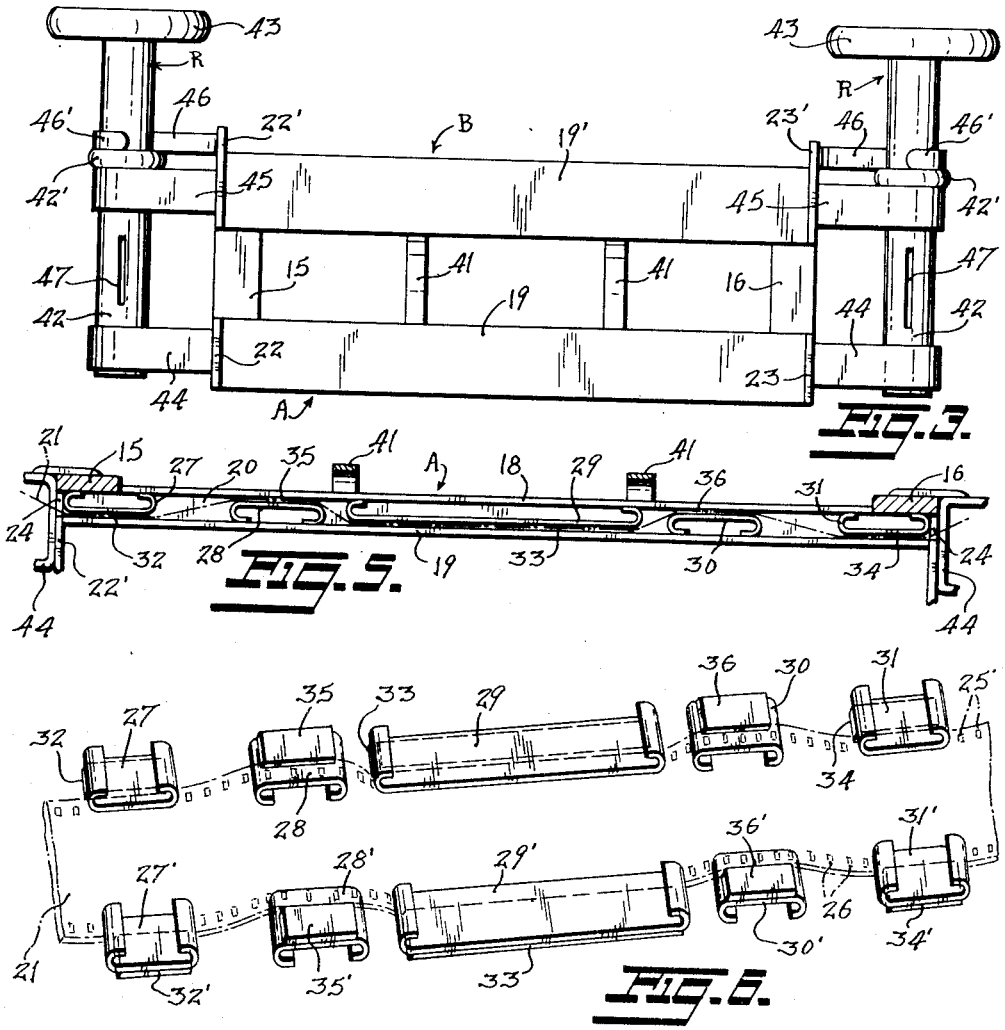
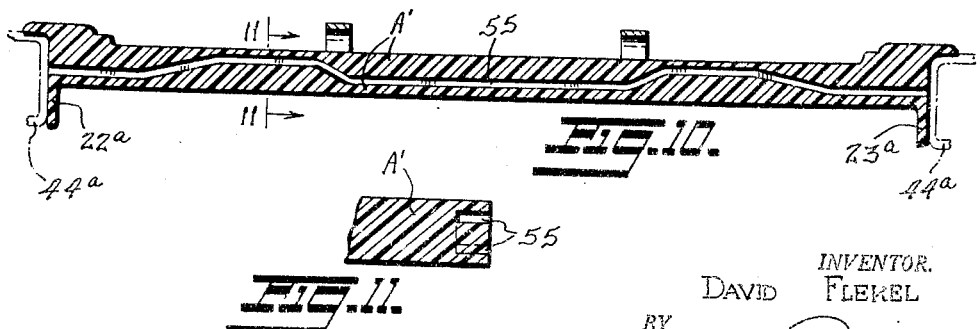

Patented July 31, 1951

2,562,708

UNITED STATES PATENT OFFICE 2,562,708

PHOTOGRAPHIC FILM TRANSPORTER

David Flekel, Bronx, N. Y.

Application January 20, 1950, Serial No. 139,731

5 Claims. (Cl. 88—24)

This invention relates to new and useful improvements in devices, generally called transports or transporters, for use with photographic enlargers and then for holding a strip of photographic film carrying a plurality of pictures in such manner that said film strip may be endwisely moved to bring a selected picture to enlarging position; and, more particularly, the aim is to provide a novel and valuable such transporter which, while of relatively simple and inexpensive type, is provided with guide means for the film so functioning that the usual curvature of the film is straightened out incidental to endwise movement or "transport" of the film through the device, with such straightening out especially perfectly effected relative to a selective picture as transported to enlarging position.

Transporters are widely used for the handling of the familiar 35 millimeter or other small width film, in coaction with a photographic enlarger, following employment of such film in miniature cameras, for adding to successive "frames" of the film, one frame after another, the pictures taken by the camera, with these pictures constituted as negatives consequent upon later development of the film. Said negatives are usually very small indeed compared to the positive prints to be made therefrom by the photographic enlarger. A true enlargement cannot be obtained unless the selected picture, when brought to enlarging position in the transporter, is stretched perfectly flat all over. On the other hand, a film strip, even long after development, has a strongly retained tendency to curl longitudinally as well as laterally.

A further feature of the transporter of the present invention is a construction whereby the same, in the shape of an elongate carrier along which is extended said guide means, with said carrier at each of its opposite ends having a manually turnable reel-in means to which is temporarily connected a different one of the two ends of the film, may be made long enough to give sufficient space to permit roll back of the film to a starting point to allow removal of any dust from the film.

Still another feature of the invention is that said guide means, essentially one which undulates in the direction of length of the transporter, engages merely the side edges of the film; with the arrangement such that no part of any of the pictures carrying portions of the film touch any part of the transporter once the film is temporarily placed on the transporter in operative relation to said guide means and said reel-in means.

The new transporter may be made of metal, a plastic or any other suitable material; and while the same will be illustrated and described herein as designed for 35 millimeter film, it is to be understood that this is merely by way of example, as the invention is not to be limited to film of that width.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 side elevationally illustrates a now favored embodiment of transporter pursuant to the invention, with the undulatory manner of longitudinal travel of the film indicated in broken lines, and with said embodiment shown in operative relation to a conventional photographic enlarger partially depicted in outline in dot and dash.

Fig. 2 is a top plan view of said transporter, with, at the left, an end portion of the film broken away, for more clearly showing a detail of construction of a reel-in means.

Fig. 3 is a bottom plan view of the transporter, before insertion of the film.

Fig. 4 is a transverse vertical section, taken on the line 4—4 of Fig. 2.

Fig. 5, drawn to a slightly enlarged scale, is a fragmentary longitudinal vertical section, taken on the line 5—5 of Fig. 2; with here the film indicated in dot and dash.

Fig. 6 is a perspective view, showing along its upper portion a line of C-shaped units of the guide means for one of the side edges of the film—this being that line of said units shown side elevationally in Fig. 5; also showing along its lower portion the corresponding line of C-shaped units of the guide means for the other side edge of the film; and further showing, in dot and dash outline, the film as guided for longitudinal undulation by said units.

Fig. 7 is a fragmentary top plan view of a modification, wherein a pair of laterally extending bow-springs, corresponding to the fixedly located pair of such springs in Figs. 1-4, are so present as to be variable in spread for adjustment purposes to adapt the transporter for optimum coaction with any one of various enlargers of different types.

Fig. 8 is a fragmentary detail vertical section, taken on the line 8—8 of Fig. 7.

Fig. 9 shows on an enlarged scale certain of the parts as seen in Fig. 7.

Fig. 10 is a longitudinal vertical section taken through another modification; this section being taken along a cutting plane locationally corresponding to that indicated by the line 5—5 of Fig. 2.

Fig. 11 is a transverse vertical section taken on the line 11—11 of Fig. 10.

The photographic film transporter according to the first form of the invention shown in Figs. 1 to 6, includes a main elongate rectangular metallic frame having like end portions 15 and 16. The sides of said frame, also alike, are inclusive of rectangular top strips 18 and 18′ and bottom strips 19 and 19′, all flat and parallel and of the same size and shape.

The two structures respectively inclusive of the strips 18 and 19, and of the strips 18′ and 19′, are hollow, and both are open all along their mutually facing sides. The proper spacing between said open sides is established by the lengths of the end portions 15 and 16. Said structures, all along their outer sides, are closed in by walls 20 and 20′.

Fixedly positioned in and suitably spaced along the structure including the strips 18 and 19 and the wall 20 are a series of substantially C-shaped units of the kind above referred to, these for participating in that part of the guide means for setting up an undulatory line of advance of one side edge of the film; and similarly arranged in the structure including the strips 18′ and 19′ and the wall 20′ are a like series of substantially C-shaped units, these for participating in the complementary part of said guide means, for setting up a corresponding undulatory line of advance for the other side edge of the film.

The film shown is designated 21; and the said structure 18—19—20 is as a whole marked A, and the said structure 18′—19′—20′ is as a whole marked B.

At one end the structure A is closed over by an upper portion of a depending leg 22 and at its other end said structure is closed over by a like depending leg 23; while at its opposite ends the structure B is closed by the upper portions of of a pair of legs 22′ and 23′ respectively corresponding to the legs 22 and 23.

Four like slots 24 are present, each through one of said four legs; whereby the film 21 may traverse the lengths of the structures A and B, during endwise advance of the film in either direction, with the side edge of the film carrying its perforations 25 extended into the interior of the structure A and with the opposite side edge of the film carrying its perforations 26 extended into the interior of the structure B.

Referring once again to the aforesaid C-shaped units, and in this connection particularly to Fig. 5 and the upper portion of Fig. 6, the series of C-shaped units participating in that part of the guide means in the structure A are inclusive, from left to right in the views last mentioned, of a unit 27, next a unit 28, next a unit 29, next a unit 30 and next a unit 31. The units 28 and 30 are vertically reversed relative to the units 27, 29 and 31; and with the central unit 29 the longest one, the unit 27 is of the same length as the unit 31, and the unit 28 is of the same length as the unit 30.

Also, the bottoms of the units 27, 29 and 31 are raised above the strip 19 by flat spacer pieces respectively indicated at 32, 33 and 34, and the tops of the units 28 and 30 are held below the strip 18 by flat spacer pieces respectively indicated at 35 and 36.

A series of corresponding C-shaped units, for constituting that part of the guide means in the structure B, and their spacer pieces, all these shown at the lower part of Fig. 6, are designated by the same reference numerals, but with primes added, as the units and spacer pieces described above as in the structure A.

In both the structures A and B, the said units are suitably secured to their associated spacer pieces, and each set of a unit and its spacer piece is suitably secured in place in its said structure A or B, as by soldering, brazing, welding or the like.

As will be noted from Fig. 6, especially when taken in connection with Fig. 2, the spacer pieces are so arranged relative to their associated C-shaped units that marginal portions of the flat central subdivisions of said units are projected beyond their spacer pieces to like extents, and in such manner that edges of said spacer pieces in the structure A which face edges of said spacer pieces in the structure B are of straightline extension, as are the last-named edges of the last-named spacer pieces, with said edges in the structure A parallel with those in the structure B; thereby to provide a guideway for the film 21 of the same width as the latter. As will be noted, further, the spacing of the opposite open sides of the structures A and B is such that portions only of the film perforations 25 and 26 are entered into said structures A and B.

Accordingly, the film 21, during endwise movement thereof in either direction, and despite the fact that the central major longitudinal subdivision of the film is freely and nonrestrictively extended across the space between the structures A and B, is made to travel along an undulating path, as clearly shown in Figs. 1, 5 and 6. Said path, it will be noted, has a plurality of rather closely adjacent reversals of direction, with the result that when the selected picture at any of the frames 37 of the film 21 is brought to enlarging position, such frame-portion of the film is temporarily yet dependably stretched absolutely flat even though retaining the well-known high degree of elastic bias always to assume a longitudinal as well as a lateral curvature.

The enlarging position for said picture is that marked off by the termini of a pair of slots 38 (Fig. 2), oppositely located, with one such slot constituted by a cut-away portion of the strip 18 and the other such slot constituted by a cut-away portion of the strip 18′. In line with these slots 38, laterally of the transporter, are the opposite ends of the central main flat portions of the C-shaped units 29 and 29′ in, respectively, the structures A and B.

The legs 22, 22′, 23 and 23′ dependent from the main portion of the transporter permit the latter to be set at the bottoms of said legs on a suitable flat support, to facilitate attaching the film strip 21. Said legs also serve as handles in setting the transporter, with its film strip therein, in proper relation to the enlarger partially indicated by dot and dash lines in Fig. 1 as including a lamp housing 39 and a lens-carrying bellows construction 40 typical of so many enlargers.

A pair of bow-springs 41 are present, these extending across the space between the structures A and B, and placed just beyond the termini of the slots 38; each of said springs at one end being suitably secured to the strip 18' and at its other end lying slidably over the strip 18. Said springs constitute a gauging means for placing the transporter properly relative to the bottom portion of the element 39 of the enlarger and so for interposing the transporter properly between said element 39 and the element 40 of the enlarger.

Like reel-in means are provided at each extreme end of the transporter. These are alike, and each is as a whole designated R. Since they are alike, a detailed description of one thereof will suffice. Considering then, in detail, the said means R at the left in Figs. 1–3, the same comprises a rod-like drum 42 integral with a turn-knob 43. Said drum has a collar-enlargement 42'. Offset from the leg 22 is a U-shaped bracket 44, and parallelly offset from the leg 22' is a similar U-shaped bracket 45. The outer ends of said brackets 44 and 45 are rounded to a diameter agreeing with that of the drum 42. Also offset from the leg 22' is a clasp-strip 46 having an outer hook-end 46' rounded also to a diameter agreeing with that of the drum 42. This clasp-strip is resiliently biased to extend as illustrated and to have its hook-end embrace the drum 42 just forward of the collar-enlargement 42' as illustrated. Thus, by manually temporarily elastically distorting said clasp-strip the drum 42 may be slid out forwardly and free of engagement with the transporter, or inserted into the brackets 44 and 45 as shown. Following any such insertion, a release of the clasp-strip 46 from its said temporary distortion frees said strip to snap to its illustrated engagement with the drum 42. Now the drum 42 is locked against endwise movement in either direction, while the action of the clasp-strip 46 is such as journally to mount said drum in both the brackets 44 and 45 solidly at the outer ends of the latter.

As already stated, the construction of the reel-in means R at the right in Figs. 1–3, is exactly as just described; except that it may be noted that whereas the brackets 44 and 45 are respectively offset from the legs 22 and 22', the corresponding brackets at the opposite end of the transporter are respectively offset from the legs 23 and 23'.

At a suitable point along its length, the drum 42 has a slot 47 therethrough, so extended that each side-wall thereof is of frusto-triangular expanse as is commonly typical of film reels as used in cameras. The drum of the other reel-in means R is similarly slotted.

Such slots in said drums permit the opposite ends of a film strip to be engaged with and satisfactorily temporarily locked to said drums; with the consequence that turning the knob 43 in a predetermined direction advances the film 21 in one direction and turning of the other knob in a predetermined direction advances the film in the opposite direction.

Referring to Figs. 7–9, the modification here shown is one wherein springs 48 corresponding to the springs 41 are provided, with these springs 48 variable as to spread, while nevertheless always maintained centralized relative to the main structure of the transporter; which main structure is illustrated partially in outline in dot and dash. The ends of the springs 48, corresponding to the ends of the springs 41 fixed to the structure B, are, instead, fixed to the tops of a pair of slide-blocks 49. Integral with a knurled thumb-piece 50, and oppositely alignedly offset from the latter, are a pair of screws 51 and 52. The threads of these screws are of opposite hand, and engage appropriately tapped apertures through the blocks 49. The screws 51 and 52 have conical outer ends 53, see Fig. 9, which are journalled in matching recesses in fixed L-shaped brackets 54. Thus, turning of the thumb-piece in one direction increases the spread of the springs 48, and turning of said thumb-piece in the opposite direction decreases the spread of the springs 48.

As is also to be understood, such elements as the springs 41 or the springs 48 or equivalents may be omitted.

Referring to the modification illustrated in Figs. 10 and 11, there is here shown a convenient and practicable design when the structures A and B or equivalents are molded from a plastic. As indicated at the brief description above of Fig. 10, the structure shown in Figs. 10 and 11, and marked A', may be taken as illustrative of a counterpart for the structure A of Figs. 1–4. Thus the parts designated 22ª, 23ª and 44ª may be taken as corresponding, respectively, to the parts 22, 23 and 44. In molding the structure A', a continuous undulating groove 55 is formed, for providing the part of the guide means to be carried by the structure A' for coacting directly with the side edge of the film carrying the perforations 25. A structure made like the structure A', but corresponding to the structure B, would also be molded; and these two structures could be spacedly joined pursuant to the invention in any suitable and convenient way.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a photographic film transporter for insertion into a photographic enlarger, a pair of spaced parallel channel-shaped members having spaced top and bottom walls and their open sides facing one another to receive the side edges of a photographic film, reel members mounted laterally across the ends of said channel-shaped members for moving the film longitudinally through said channel-shaped members, laterally aligned elongated C-shaped members mounted within said channel-shaped members intermediate of their ends at the area where a particular negative of the film is to be located for enlargement, laterally aligned pairs of shorter C-shaped members mounted within said channel-shaped members on opposite sides of said elongated C-shaped members, and means alternately spacing said C-shaped members at their closed sides from the respective top and bottom walls of said channel-shaped members forming a tortuous path for the photographic film to straighten the same as it moves through said channel-shaped members.

2. In a photographic film transporter for insertion into a photographic enlarger, a pair of spaced parallel channel-shaped members having spaced top and bottom walls and their open sides facing one another to receive the side edges of a photographic film, reel members mounted laterally across the ends of said channel-shaped members for moving the film longitudinally through said channel-shaped members, laterally aligned elongated C-shaped members mounted within said channel-shaped members intermediate of their ends at the area where a particular negative of the film is to be located for enlargement, laterally aligned pairs of shorter C-shaped members mounted within said channel-shaped members on opposite sides of said elongated C-shaped members, and means alternately spacing said C-shaped members at their closed sides from the respective top and bottom walls of said channel-shaped members forming a tortuous path for the photographic film to straighten the same as it moves through said channel-shaped members, said C-shaped members of each of said channel-shaped members having their open sides facing alternately up and down, said spacing means comprising spacer pieces inserted between the adjacent faces of the closed sides of said C-shaped members and the respective arms of said channel-shaped members.

3. In a photographic film transporter for insertion into a photographic enlarger, a pair of spaced parallel channel-shaped members having spaced top and bottom walls and their open sides facing one another to receive the side edges of a photographic film, reel members mounted laterally across the ends of said channel-shaped members for moving the film longitudinally through said channel-shaped members, laterally aligned elongated C-shaped members mounted within said channel-shaped members intermediate of their ends at the area where a particular negative of the film is to be located for enlargement, laterally aligned pairs of shorter C-shaped members mounted within said channel-shaped members on opposite sides of said elongated C-shaped members, and means alternately spacing said C-shaped members at their closed sides from the respective top and bottom walls of said channel-shaped members forming a tortuous path for the photographic film to straighten the same as it moves through said channel-shaped members, and legs depended from the ends of said channel-shaped members.

4. In photographic film transporter for insertion into a photographic enlarger, a pair of spaced parallel channel-shaped members having spaced top and bottom walls and their open sides facing one another to receive the side edges of a photographic film, reel members mounted laterally across the ends of said channel-shaped members for moving the film longitudinally through said channel-shaped members, laterally aligned elongated C-shaped members mounted within said channel-shaped members intermediate of their ends at the area where a particular negative of the film is to be located for enlargement, laterally aligned pairs of shorter C-shaped members mounted within said channel-shaped members on opposite sides of said elongated C-shaped members, and means alternately spacing said C-shaped members at their closed sides from the respective top and bottom walls of said channel-shaped members forming a tortuous path for the photographic film to straighten the same as it moves through said channel-shaped members, and positioning springs extended laterally across said channel-shaped members outward of the ends of said elongated C-shaped members.

5. In a photographic film transporter for insertion into a photographic enlarger, a pair of spaced parallel channel-shaped members having spaced top and bottom walls and their open sides facing one another to receive the side edges of a photographic film, reel members mounted laterally across the ends of said channel-shaped members for moving the film longitudinally through said channel-shaped members, laterally aligned elongated C-shaped members mounted within said channel-shaped members intermediate of their ends at the area where a particular negative of the film is to be located for enlargement, laterally aligned pairs of shorter C-shaped members mounted within said channel-shaped members on opposite sides of said elongated C-shaped members, and means alternately spacing said C-shaped members at their closed sides from the respective top and bottom walls of said channel-shaped members forming a tortuous path for the photographic film to straighten the same as it moves through said channel-shaped members, and positioning springs extended laterally across said channel-shaped members outward of the ends of said elongated C-shaped members, and means mounting said springs at one of their ends on one of said channel-shaped members for movement longitudinally of said channel-shaped members.

DAVID FLEKEL.

REFERENCES CITED

The following references are of record in the file of this patent:

UNITED STATES PATENTS

| Number | Name | Date |
| --- | --- | --- |
| 1,933,783 | Wittel | Nov. 7, 1933 |
| 1,955,938 | Berkowitz | Apr. 24, 1934 |
| 2,199,305 | Dewey | Apr. 30, 1940 |
| 2,461,668 | Thompson | Feb. 15, 1949 |